(12) United States Patent
Horsting

(10) Patent No.: US 6,740,847 B1
(45) Date of Patent: May 25, 2004

(54) METHOD OF FORMING MULTIPLE MACHINING SPOTS BY A SINGLE LASER

(75) Inventor: John James Horsting, Williamsburg, VA (US)

(73) Assignee: Siemens VDO Automotive Corporation, Auburn, MI (US)

( * ) Notice: Subject to any disclaimer, the term of this patent is extended or adjusted under 35 U.S.C. 154(b) by 0 days.

(21) Appl. No.: 10/383,505

(22) Filed: Mar. 10, 2003

(51) Int. Cl.⁷ .............................................. B23K 26/00
(52) U.S. Cl. ................... 219/121.7; 219/121.71
(58) Field of Search .................. 219/121.7, 121.71, 219/121.67, 121.72, 121.85

(56) References Cited

U.S. PATENT DOCUMENTS

| | | | |
|---|---|---|---|
| 3,588,218 A | * 6/1971 | Hunt et al. | 359/212 |
| 3,953,706 A | 4/1976 | Harris et al. | 219/121 L |
| 4,059,876 A | 11/1977 | Ditto | 29/156.7 A |
| 4,160,894 A | 7/1979 | Stemmler et al. | 219/121 L |
| 4,370,540 A | 1/1983 | Davis et al. | 219/121 LM |
| 4,636,611 A | * 1/1987 | Penney | 219/124.34 |
| 4,694,139 A | 9/1987 | Roder | 219/121 |
| 4,818,834 A | 4/1989 | Rupert | 219/69.17 |
| 4,911,711 A | 3/1990 | Telfair et al. | 606/5 |
| 5,043,553 A | 8/1991 | Corfe et al. | 219/121.7 |
| 5,093,548 A | 3/1992 | Schmidt-Hebbel | 219/121.71 |
| 5,163,934 A | 11/1992 | Munnerlyn | 606/5 |
| 5,237,148 A | 8/1993 | Aoki et al. | 219/121.7 |
| 5,523,544 A | 6/1996 | Hertzel et al. | 219/121.7 |
| 5,607,606 A | 3/1997 | Mori et al. | 219/121.67 |
| 5,632,083 A | 5/1997 | Tada et al. | 29/827 |
| 5,670,069 A | 9/1997 | Nakai et al. | 219/121.73 |
| 5,885,199 A | 3/1999 | Shao | 483/19 |
| 6,172,331 B1 | 1/2001 | Chen | 219/212.71 |
| 6,229,113 B1 | 5/2001 | Brown | 219/121.7 |
| 6,264,486 B1 | 7/2001 | Jiang et al. | 439/161 |
| 6,365,871 B1 | 4/2002 | Knowles et al. | 219/121.7 |
| 6,541,732 B2 | * 4/2003 | Hirose et al. | 219/121.7 |

FOREIGN PATENT DOCUMENTS

| | | |
|---|---|---|
| JP | 9-225665 | 9/1997 |
| JP | 9-236066 | 9/1997 |

OTHER PUBLICATIONS

U.S. patent application No. 09/917,917, J. Horsting, filed Jul. 31, 2001, pending.
U.S. patent application No. 09/909,974, C. Hamann, filed Jul. 23, 2001, pending.

* cited by examiner

Primary Examiner—M. Alexandra Elve

(57) ABSTRACT

A method and apparatus for forming a plurality of orifices in a work piece with a single laser at a rated power density that provides two independent laser machining spots with each laser machining spot having nearly the same power density as the rated power density of the single laser.

25 Claims, 3 Drawing Sheets

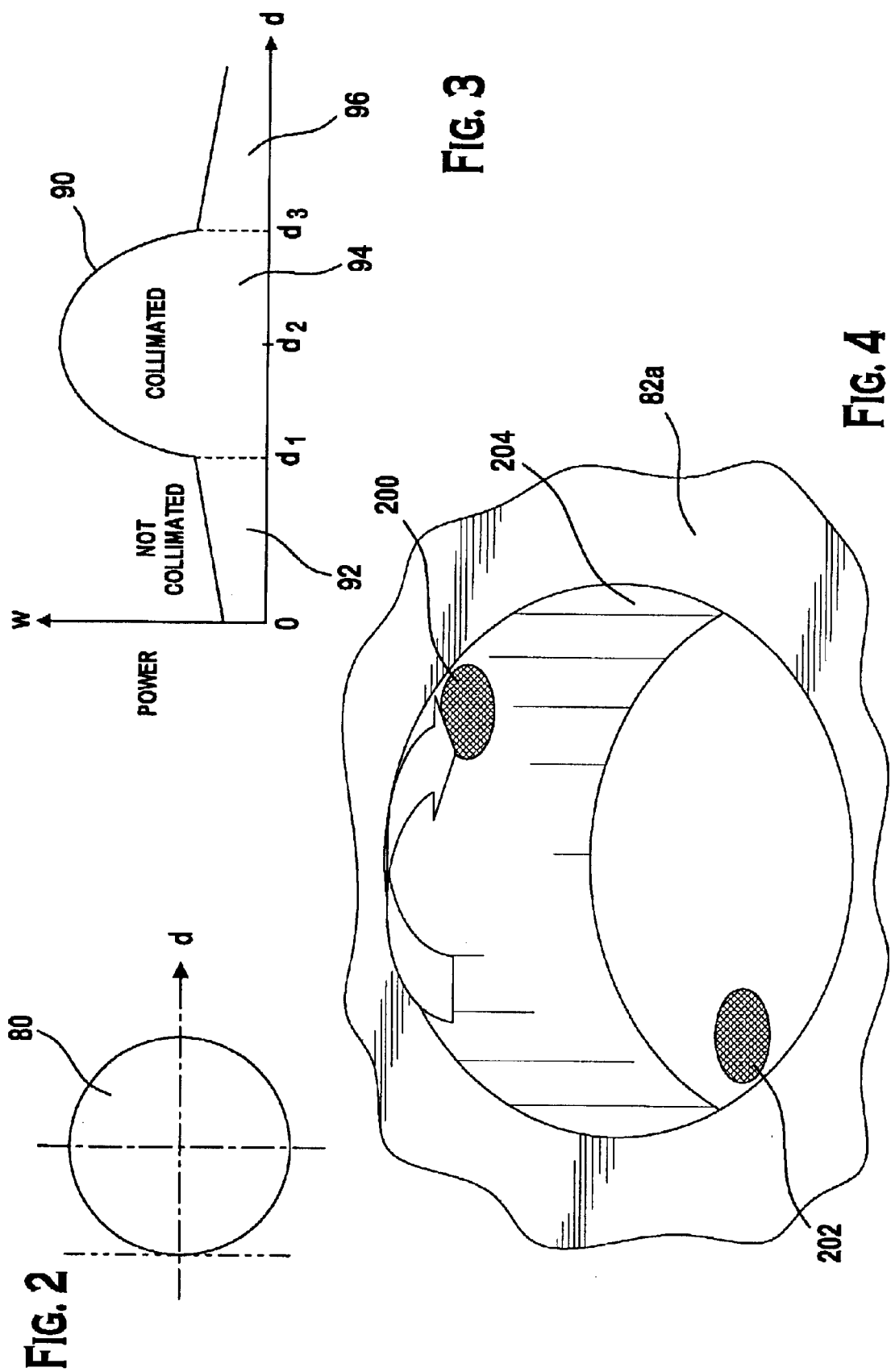

METHOD OF FORMING MULTIPLE MACHINING SPOTS BY A SINGLE LASER

BACKGROUND OF THE INVENTION

Fuel flowing through a fuel injector typically exits at a nozzle end of the fuel injector. The nozzle end is believed to have a disk with at least one orifice to control, in part, the spray pattern and the direction of the fuel exiting the fuel injector.

The orifice used in fuel injectors is believed to be formed by drilling through a workpiece that can be of a suitable cross section. The work piece is believed to be further machined so that the work piece can be assembled with the nozzle end of a fuel injector.

At least two laser-machining techniques are believed to be used for machining orifices. One is percussion drilling, and the other is trepanning or helical drilling. Percussion drilling is believed to be less than desirable due to a variation in beam profile and targeting or the random nature of metal heating and expulsion that most likely result in a non-cylindrical or non-circular orifice. Trepanning, on the other hand, is believed to be more precise as a center hole is believed to be initially formed before the formation of the orifice and is believed to create less debris during machining. Helical drilling is similar to trepanning but without the initial formation of a center hole.

Regardless of the techniques, a single laser is typically used to machine a single work piece at a time in such laser system. In order to maximize the use of the laser system, it would be desirable to increase the ability to form more than one orifice at a time on a single work piece or to form orifices on more than one work piece at a time. It would also be desirable to increase the number of consistent quality orifices produced by a single laser machining system.

SUMMARY OF THE INVENTION

The present invention provides for at least one method of generating multiple focus spots on a work piece by a single laser light source in a laser system. The laser light source has a laser beam extending along a beam axis that intersects with a work piece. The work piece has a first surface spaced from a second surface at between 50 to 600 microns. In one preferred embodiment of the invention, the method can be achieved, in part, by directing a first perimeter of the laser beam to a first position on at least one of the surfaces of the work piece at a first power density sufficient to machine materials on the work piece between the first and second surfaces; and redirecting a portion of the laser beam within the first perimeter that forms a second perimeter to a second position on the at least one surface of the work piece at a second power density sufficient to machine materials on the work piece between the first and second surfaces.

BRIEF DESCRIPTIONS OF THR DRAWINGS

The accompanying drawings, which are incorporated herein and constitute part of this specification, illustrate an embodiment of the invention, and, together with the general description given above and the detailed description given below, serve to explain the features of the invention.

FIG. 2 is a schematic view of a laser beam according to a preferred embodiment.

FIG. 3 is a simplified graph illustrating a distribution of power across the preferred embodiment of a laser beam of FIG. 2.

FIG. 4 is a schematic illustration of the location of the laser machining spots on a sample work piece.

DETAILED DESCRIPTION OF THE PREFERRED EMBODIMENTS

FIGS. 1–4 illustrate preferred embodiments of laser systems that allow multiple laser beams with each beam having a generally constant power density from a single laser machine to be formed.

Figure 1A:
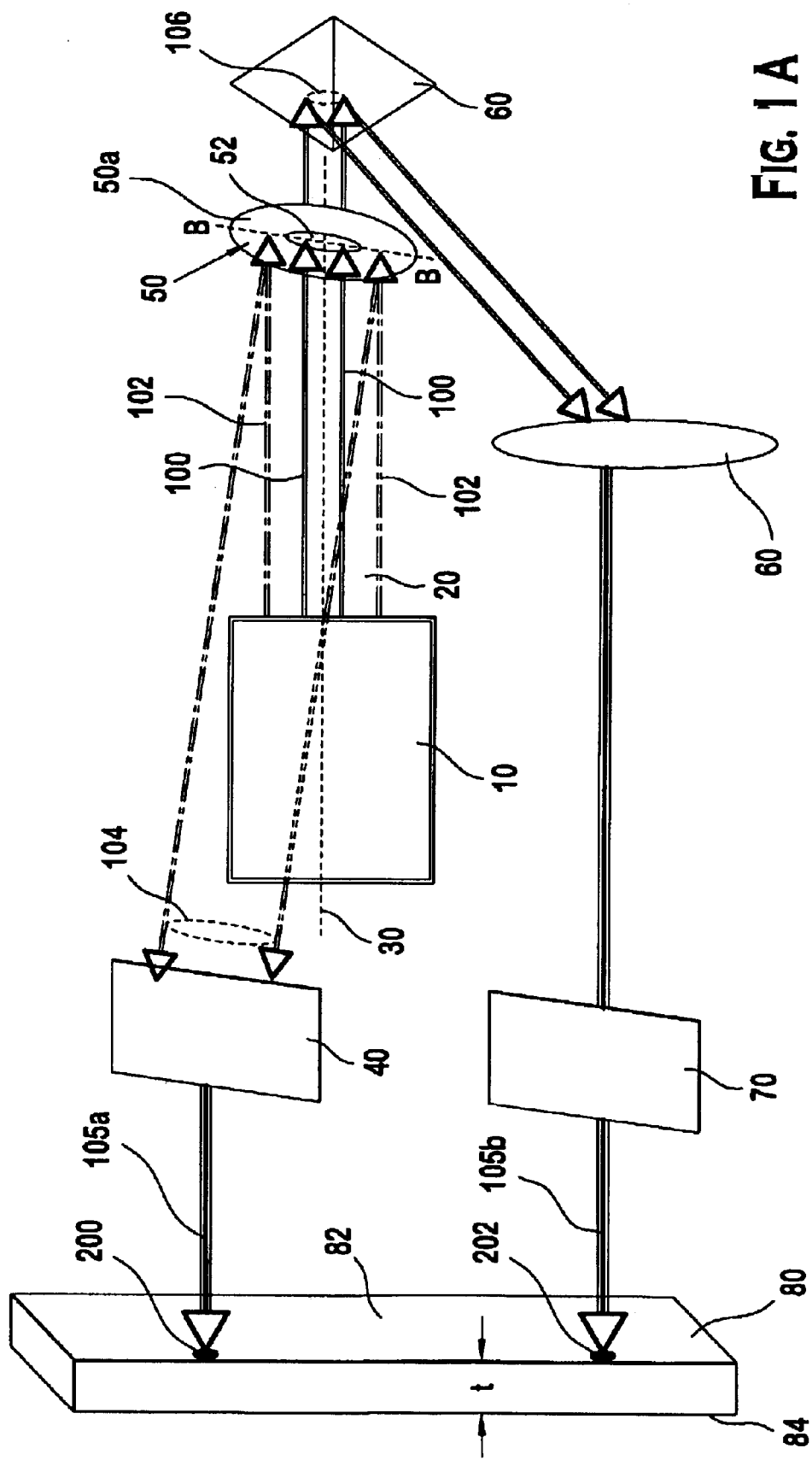
FIG. 1A is a simplified schematic view of the components of a system involved in the formation of constant power density, multiple-beams according to a preferred embodiment.
Figure 1B:
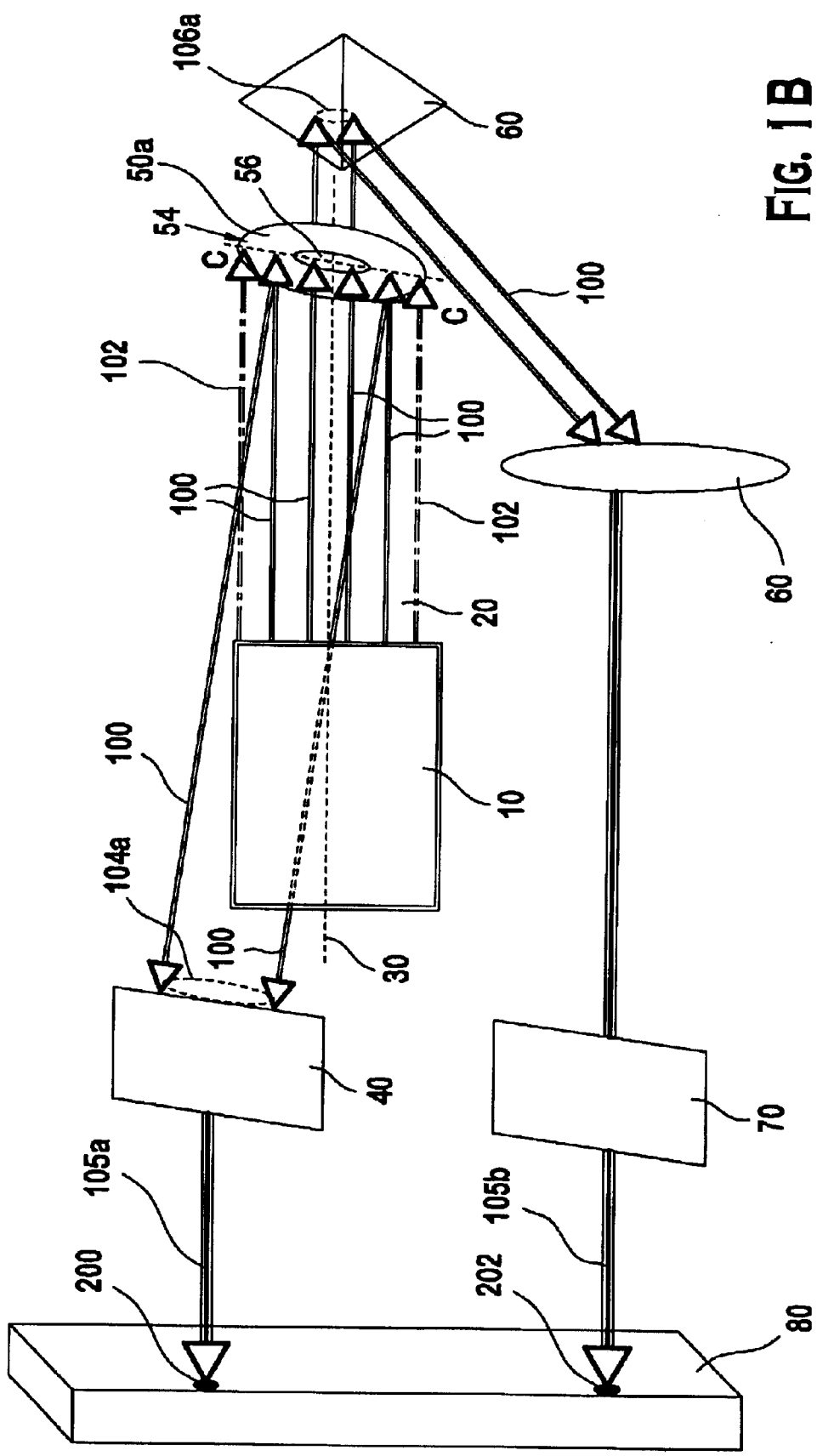
FIG. 1B is a simplified schematic view of components of an alternate system involved in the formation of constant power density, multiple-beams according to another preferred embodiment.

Referring to FIGS. 1A and 1B, a laser 10 provides a laser beam 20 of generally coherent light that can also be nearly monochromatic and generally collimated along a beam axis 30 towards first optical assembly 40, scraper reflector 50 or 52, redirecting optical assembly 60 and second optical assembly 70, and a work piece 80.

The laser 10 can provide laser beam 20 of a different cross-sectional area, such as, for example, square, rectangular, circular or other suitable polygons. In a preferred embodiment, the laser beam 20 is generally circular in cross-sectional area 80, shown here in FIG. 2. Power distribution of the laser beam 20 can be correlated to the diameter of the cross-sectional beam area 80 to provide for a beam profile 90. That is, as shown in FIG. 3, the power of the laser beam 20 increases at a first slope over a first distance $d_1$, from a first position on the outer circumference of the cross-sectional beam area due to a changing mixture of collimated light 100 and non-collimated light 102. The changing mixture of collimated light and non-collimated light includes collimated light that increases relative to non-collimated light to define a first outer region 92 of power density, i.e., power (Watts) over area $(d/2)^2 * \pi$ or "fluence" in Watts/centimeter-squared. At a given distance greater than $d_1$ near a central area of the cross-sectional beam area, power rises in a non-linear fashion due to a much greater concentration of collimated light towards a maximum level at the proximate center of the cross-sectional beam area at $d_2$, which then decreases in a non-linear fashion away from the center to define a center region 94. At a second position $d_3$ generally diametric to the first position, power decreases at a second slope inverse to the first slope due to the increasing level of non-collimated portion of laser light to define a second outer region 96. It is noted that collimated light usually determines a rated power density of a laser 10 due to the nature of non-collimated light, which may be less useful than collimated light.

The laser light source 10 can be any laser with sufficient power density (i.e., quantifiable as Watt per centimeter squared) "to machine" a work piece. As used herein, the term "to machine" or "machining" denotes that application of a laser light of a sufficient power density to remove materials on one or more of the surfaces of the work piece 80 in order to form, for example, surface geometries or to drill through the work piece between the first and second surfaces in order to form, for example, orifices of different cross-sections. Preferably, the laser light source 10 can be Model LM100, LM100X, or LM150 sold by Oxford Laser™ with a rated power density of at least one Megawatt per centimeter-squared (1 Megawatt/cm²). More preferably, the power density of the laser light source 10 should be less than or equal to $1 \times 10^{12}$ Watts per centimeter-squared (1 Terawatt/cm$^2$) and the laser light source 10 can be a solid state laser, a copper vapor laser, a Neodymium:Vanadate (Nd:VAN) laser, or a frequency doubled Neodymium:Yttrium-Aluminum-Garnet (Nd: YAG) laser having a wavelength between approximately 511 nanometers to approximately 578 nanometers.

It is believed that the outer regions 92 and 96 and the central region 94 of the laser beam 20 can provide at least two power densities with each power density formed by a combination of the outer regions 92 and 96 being approximately equal to the power density of the central region 94. And by virtue of the preferred embodiments disclosed herein, a single laser beam 20 can be used to provide at least two focus or machining spots of nearly the same power density from a single laser. That is, according to the preferred embodiments, a single laser of a rated power density can function as if it were two "separate" lasers, with each "separate" laser having the same rated power density of the single laser to thereby provide nearly twice the rated power density, or to double the machining capability of the single laser.

Referring to FIG. 1A, the laser provides a beam 20 of laser light that may include collimated light 100 and non-collimated light 102 along beam axis 30. A first scraper reflector 50 is placed such that a plane B—B on which the first scraper reflector 50 may lie on is oblique to the beam axis 30 so as to permit a first perimeter 104 of the non-collimated portion 102 of light radially outward of the beam axis 30 to reflect off the reflective surface 50a of the scraper reflector 50. This reflected first perimeter 104 of non-collimated light 102 is directed to first optical assembly 40, shown in schematic form that recollimates the non-collimated light 102 to form a collimated beam of light 105a for a first machining spot 200. A second perimeter 106 of a portion of the collimated light 100 that is radially inward of the non-collimated portion is permitted to pass through a first sufficiently sized opening 52 of the first scraper reflector 50 so that redirecting optical assembly 60 and second optical assembly 70 redirect the collimated portion of light. The redirected collimated light 100 can be expanded so that the second perimeter 106 of light is approximately the same cross-sectional area as the first perimeter 104 portion.

Subsequently, the expanded second perimeter portion 106 can be collimated (depending on whether the second perimeter portion is non-collimated or not) by a telescopic arrangement or an aspherical surface of a reflector (e.g., scraper 50) that can be part of the second optical assembly or formed as a separate arrangement. Alternatively, the second optical assembly can include a beam expander, such as, for example, a diverging lens or second optical assembly with a pinhole. Regardless of the actual optical arrangements, the second optical assembly 70 operate to focus the expanded and collimated second perimeter portion 106 of light 105b to a second machining spot 202 that can be of the same size as the first machining spot 200. It should be noted that the optical assemblies 40, 50, 60, 70 can include a prism, turning mirror, focusing lenses and suitable optics in each of the optical assemblies that allow each of the beams 105a, 105b to be directed generally perpendicular to the workpiece in the preferred embodiments. Preferably, the opening 52 of the first scraper reflector 50 is sized so that substantially the entire collimated portion 100 of light 20 passes through the opening 52.

The work piece 80 can be of any suitable material and dimension or shapes for laser machining, including that of a thin metallic plate. Preferably, the work piece 80 is stainless steel and generally planar in shape with a first surface 82 generally parallel to a second surface 84 at a distance (i.e., a thickness "t") of approximately 50 to 600 microns, and more particularly of about 300 microns. Also preferably, the laser machine 10 is configured to machine generally circular orifices 204 of consistent orifice quality extending through the work piece 80 of approximately 20 microns to 300 microns in diameter, and particularly one or more orifices of about 160 microns in diameter over a duration of one of a fraction of a millisecond, at least one millisecond, or in multiple pulses over a duration of about thirty seconds.

As used herein, the term "orifice qualities" can include parameters such as, for example, taper and ellipticity of the orifice in percentage form, where the taper is a difference between average entry diameter and average exit diameter and divided by thickness of the work piece multiplied by 100 and the ellipticity is a difference between the major diameter and minor diameter multiplied by two and the result divided by the sum of the major diameter and minor diameter multiplied by 100. Preferably, the variation between the taper of the at least one orifice is about +10% and other orifices and variation between ellipticity of each orifice with other orifices is +10%.

It should be noted that the light source of FIG. 1A can include a light source that, regardless of whether the light is collimated, non-collimated or a mixture thereof, provides a sufficient power density to machine a workpiece. This light source can be divided by a ratio such that two or more beams can be obtained where each beam has generally the same power density as the other beams of the light source. Moreover, the light source is not limited to a single laser light source 10 but can be, for example, a plurality of light sources. One light source of the plurality of light sources can be a first light source that produces nearly all collimated light 100. Another light source of the plurality of light sources can be a second light source (not shown) that produces a sufficient power density of non-collimated light 102. Alternatively, at least one of the light sources can be a non-laser light source while the other light source(s) of the plurality of light sources can be a laser light source. Where two or more laser light sources are used to produce the respective collimated light 100 and non-collimated light 102, the laser light sources can be individually pulse width modulated to control the power density or irradiance of the respective collimated light 100 and non-collimated light 102. The use of two or more light sources is believed to eliminate additional optics required for a single source. Preferably, a single laser light source 10 is used such that a ratio of irradiance, or power density, between the collimated light 100 and non-collimated light 102 can be between approximately 1:1 to approximately 0.1:1, and a surface area of the non-collimated light 102 can be approximately 1 to approximately 4 times or more of the surface area of the collimated light 100 as viewed on a virtual plane orthogonal to the laser beam axis 30.

Referring to FIG. 1B, the laser provides a beam 20 of laser light along beam axis 30. In the preferred embodiment, the laser can be a solid-state laser that provides nearly all collimated light output. Although non-collimated light 102 output can be produced in the preferred embodiment of FIG. 1B, it is preferable to utilize the collimated light 100 portion to form the multiple focus or machining spots rather than a mixture of collimated light 100 and non-collimated light 102 as in the exemplary preferred embodiment of FIG. 1A. And although a scraper reflector is also used in FIG. 1B, the second scraper reflector 54 has a different surface area with an aspherical reflective surface and the reflector 54 is oriented on a plane C—C, which can be oriented at an angle different than that of plane B—B in order to obtain a suitable reflective geometry. Preferably, the surface area of the second scraper reflector 54 is less than the surface area of the first scraper reflector 50 and the reflective surface is aspherically curved in a suitable manner so as to match the angular dispersion of each non-collimated light ray along a radius out from the centerline of the beam.

The second scraper reflector 54 is located on a plane C—C, which is oblique to the beam axis 30 so as to permit a first perimeter 104a of the collimated light 100 radially outward of the beam axis 30 to reflect from the reflective surface 50a of the second scraper reflector 54. This reflected collimated light 100 is directed to first optical assembly 40, shown in schematic form here, that allows a collimated beam of light to form a first machining spot 200. A second perimeter 106a of the collimated light 100 that is radially inward of the first portion 104a is permitted to pass through a second sufficiently sized opening 56 of the second scraper reflector 54 so that the second perimeter 106a of collimated light 100 is redirected by redirecting optical assembly 60 and second optical assembly 70. The redirected collimated light 100 can be expanded so that the second perimeter 106a of light is approximately the same cross-sectional area as the first portion.

Subsequently, the expanded second portion can be recollimated by a telescopic arrangement that can be part of the second optical assembly or formed as a separate arrangement. Alternatively, the second optical assembly can include a beam expander, such as, for example, a diverging lens or focusing optics with a pinhole. Regardless of the actual optical arrangements, the redirecting optical assembly 60 and second optical assembly 70 operates to focus the expanded and collimated second perimeter 106a of light to a second machining spot 202 that can be of the same size as the first machining spot 200. Each spot is spaced away from the other spot and the work piece 80 can rotate about an axis so that an orifice can be machined by the stationary machining spots. Alternatively, the work piece 80 can remain stationary while the machining spots can rotate about an axis so as to form an orifice. In yet another alternative, the first machining spot 200 can machine a first work piece 80 and the second machining spot 202 can machine a second work piece 80.

Referring to FIG. 4, a pictorial representation of two machining spots, 200 and 202 on a sample work piece is illustrated. Although each of the machining spots is shown pictorially as a homogeneous spot, it should be noted in the preferred embodiments that each of the machining spots has two generally concentric areas of respective power densities where the power density of the inner area is less than the outer area. That is, each of the machining spots 200, 202 has an inner area and an outer area of laser light of respective different magnitudes of power density, which are to be contrasted with the generally single area of power density of the laser beam 20 (FIG. 2) of the preferred embodiments. Preferably, the inner area of each of the machining spot is about 70% of the area of the laser beam 20 prior to optical manipulations in order to achieve multiple focusing spots as described herein.

Each focusing or machining spot is spaced away from the other machining spot, and the work piece 80 can rotate about an axis so that an orifice can be machined by the stationary machining spots. Alternatively, the work piece 80 can remain stationary while the machining spots can rotate about an axis generally parallel to the beam axis 30 so as to form an orifice 204. In yet another alternative, the first machining spot 200 can machine a first work piece 80 and the second machining spot 202 can machine a second work piece (not shown). In yet another, the first machining spot 200 can machine a first surface 82 while a second machining spot 202 can machine a second surface 84 or vice versa. And in yet another alternative, one of the first and second machining spots 200, 202 can form a through orifice 204 while the other of the first and second machining spots 200, 202 can form a chamfer (not shown) to provide for an increase in discharge orifice coefficient. As described herein, the term "chamfer" refers to a surface geometry of an orifice that can include an opening of the orifice or at any point between the first surface 82 and the second surface 84 of the at least one orifice 204. The surface geometry can be, for example, a square edge, a taper or a cone.

In the preferred embodiments, the first machining spot 200 can be directed to the work piece 80 at a first time interval and the second machining spot 202 can be directed to a different or same work piece 80 at a second time interval that can overlap each other. Alternatively, the machining spot corresponding to one of the first and second time intervals can be initiated while the light corresponding to the other time interval is not initiated until a time interval has passed such that the first and second time intervals end at the same instant in time. Preferably, the first and second time intervals are initiated substantially simultaneously and can terminate at the same time or at different intervals.

The preferred embodiments described herein can be used to form orifices for use in fuel injectors. Other applications can include, for example, ink-jet and laser printers, microcircuits including microcircuit boards, micro-machined devices, or any other devices which require a plurality of orifices of consistent dimensionalities and an uniform orifice coefficient for each of the orifices. The dimensionalities can be, for example, the diameter of the orifice, the diameters of the chamfer that can be used to describe the cross-sectional curve of the chamfer in three-dimension, the taper, or ellipticity of each orifice.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of generating multiple focus spots on a workpiece by a single laser light source having a laser beam extending along a beam axis, the workpiece having a first surface spaced from a second surface between 50 to 600 microns, the method comprising:

directing a first perimeter of the laser beam to a first position on at least one of the surfaces of the work piece at a first power density sufficient to machine materials on the work piece between the first and second surfaces; and redirecting a portion of the laser beam within the first perimeter that forms a second perimeter to a second position on the at least one surface of the work piece at a second power density sufficient to machine materials on the work piece between the first and second surfaces.

2. The method of claim 1, wherein the redirecting comprises removing material on the at least one surface of the work piece of the work piece at the second position spaced from the first position.

3. The method of claim 1, wherein the redirecting comprises removing material on the at least one surface of the work piece at a second position that overlaps the first position.

4. The method of claim 1, wherein the redirecting comprises removing material on the at least one surface of the work piece at a second position that coincides with the first position.

5. The method of claim 1, wherein the directing comprises one of machining through the work piece between the first and second surfaces and removing materials on at least one of the first and second surfaces.

6. The method of claim 1, wherein the redirecting comprises one of machining through the work piece between the first and second surfaces and removing materials on at least one of the first and second surfaces.

7. The method of claim 2, further comprising rotating one of the work piece or the portion and the enlarged inner beam about a longitudinal axis so as to form an orifice extending through the work piece.

8. The method of claim 2, further comprising rotating the portion about its own axis and rotating enlarged inner beam about its own axis so as to form two orifices extending through the work piece.

9. The method of claim 1, wherein the directing comprises reflecting the laser beam off a scraper reflector disposed on a plane oblique to the beam axis.

10. The method of claim 9, wherein the redirecting comprises permitting the inner beam to pass through the scraper reflector to a diverging reflector and a collimating lens.

11. The method of claim 9, wherein a diameter of the orifice is between approximately 20 microns and approximately 650 microns.

12. The method of claim 9, wherein the at least one laser light source comprises at least one of a gas or a solid-state laser.

13. The method of claim 9, wherein a wavelength of laser light source comprises a wavelength between approximately 511 nanometers to approximately 578 nanometers.

14. The method of claim 9, wherein the laser light source comprises at least one of a copper vapor laser and a frequency doubled Neodymium:Yttrium-Aluminum-Garnet (Nd:YAG) laser.

15. The method of claim 14, wherein the laser light source comprises a laser light with a power density of at least $1 \times 10^6$ Watts per centimeter-squared (1 Megawatt/cm$^2$).

16. The method of claim 9, wherein the inner beam of collimated light is approximately one-fourth the size of the annular outer beam.

17. The method of claim 9, wherein the directing comprises one of forming a chamfer and forming a through orifice.

18. The method of claim 17, wherein the redirecting comprises the other of the forming of the chamfer and forming the through-orifice.

19. The method of claim 18, wherein the forming of the chamfer is at a first time interval and the forming of the through-orifice is at a second time interval during the first time interval.

20. The method of claim 19, wherein the first time interval is substantially equal to the second time interval.

21. The method of claim 19, wherein the first time interval is greater than the second time interval.

22. The method according to claim 18, wherein the second time interval is greater than the first time interval.

23. The method according to claim 1, wherein the directing further comprises reflecting a collimated portion of the first perimeter of the laser beam to the first position; and redirecting a collimated portion of the second perimeter of the laser beam to the second position on the work piece so that the collimated portion of the second perimeter has generally the same power density as the collimated portion of the first perimeter.

24. The method according to claim 1, wherein the first power density is approximately equal to the second power density.

25. The method of claim 1, wherein the directing further comprises recollimating a non-collimated portion at a first power density approximately equal to the second power density.

* * * * *